UNITED STATES PATENT OFFICE.

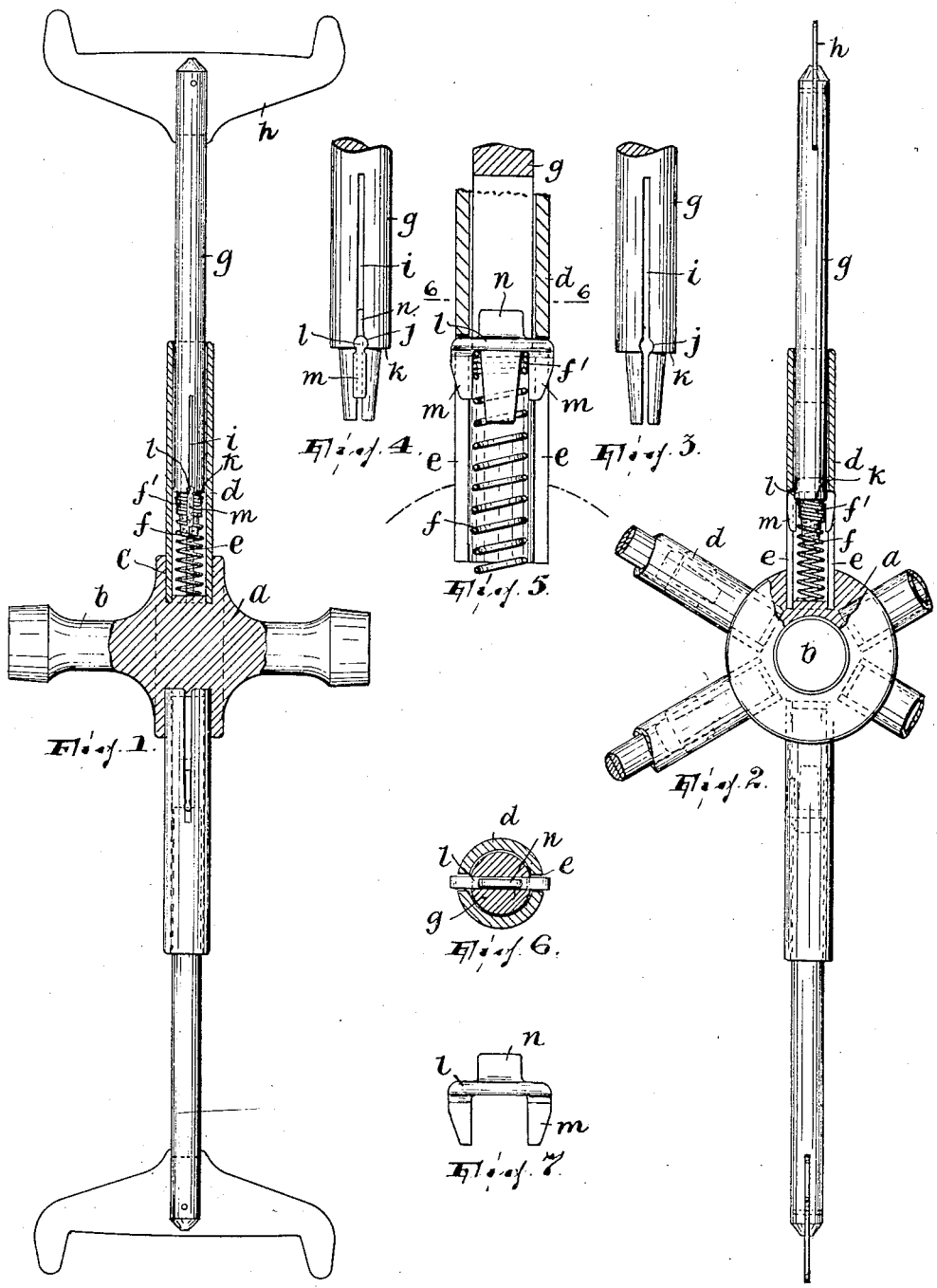

WILLIAM C. KEYWORTH, OF PATERSON, NEW JERSEY.

SWIFT FOR REELING-MACHINES.

1,352,458. Specification of Letters Patent. Patented Sept. 14, 1920.

Application filed February 25, 1919. Serial No. 279,077.

*To all whom it may concern:*

Be it known that I, WILLIAM C. KEYWORTH, a citizen of the United States, residing at Paterson, in the county of Passaic and State of New Jersey, have invented certain new and useful Improvements in Swifts for Reeling-Machines, of which the following is a specification.

In my application for Letters Patent bearing the Serial Number 266,957 I have disclosed a swift for winding machines wherein the skein supporting members or spokes, arranged in radial sockets in the center part of the swift, are made each in two disconnectively connected parts of which one has limited radial and inwardly cushioned movement in suitable radial ways (as slots) in its socket and the other is outwardly detachable therefrom, as by a radial slit therein receiving and forming a slip-grip connection with the first-named part. In the previous construction the first-named part took the form of a transverse pin. It is the principal object of my present invention to substitute for this pin an element that will serve to better advantage than the pin in assembling and disassembling the parts, give a better finish to the radial portions of the swift and omit projections on which the thread might catch, and avoid wearing away of the parts engaged by it.

In the drawing,

Figure 1 is an elevation of the improved swift taken at right angles to its axis of rotation, certain parts appearing in section;

Fig. 2 is a side elevation, certain parts appearing in section, and others broken away;

Figs. 3 and 4 show side elevations of the inner end of the outer or skein-receiving part of one of the spokes, Fig. 4 also showing the inner part or gib in place in the slit of the outer part;

Fig. 5 is an enlarged sectional view of one of the sockets and the other parts associated therewith, the section being taken in a radial plane coincident with the slots of the socket;

Fig. 6 is a sectional view on line 6—6, Fig. 5; and

Fig. 7 is an elevation of the gib.

The center part of the improved swift is shown as comprising a hub $a$, provided with axial bearing portions $b$, and having tubular sockets $d$ set at their inner ends in radial holes $c$ in the hub, each socket having longitudinal diametrically opposite slots $e$ terminating short of the outer end of the socket. $f$ designates a spiral spring arranged in each socket and bearing at its inner end against the bottom of the socket afforded by the hub. The construction as so far described is or may be substantially the same as that disclosed in my aforesaid application. As also disclosed in my aforesaid application, there is a skein supporting spoke or member arranged and movable radially in each socket and having its outward movement limited by the slot $e$, and this spoke includes, with the novel inner part or gib to be later described in detail, an outer or skein carrying part which is substantially the same as in my said application and consists of a straight shank $g$ having at its outer end a transverse suitably shaped skein supporting blade $h$ and its inner end portion formed with a longitudinal slit $i$ which is transversely enlarged, as at $j$, the said inner end portion of the shank being reduced and forming a shoulder $k$. As in my previous construction referred to, the outer end of the spring $f$ receives the reduced inner end of the shank $g$ and it bears against the shoulder $k$; but in the present construction I preferably arrange the outer-end convolutions of the spring close together so as to form in effect a collar $f'$ (Figs. 1, 2 and 5) for a purpose to be explained.

The inner part of the skein supporting member or spoke, to wit, the gib hereinbefore mentioned, consists of a transverse bar $l$ having at its ends a pair of flat blades $m$ projecting from the bar in the same direction and in the same plane, said blades being parallel but having their outer edges converging away from the bar; the gib also preferably includes a flat tongue $n$ in the same plane as the blades $m$ but projecting from the bar $l$ in the relatively opposite direction. The bar, which is more or less round in cross section, is about the same diameter as the enlargement $j$ in the shank $g$ of the outer part of the spoke, and the blades $m$ and tongue $n$ are about as thick as the slots $e$ in the socket and the slit $i$ in shank $g$, respectively, are wide. The blades $m$ are spaced apart a sufficient distance to admit between them the outer end of the spring $f$. In the assembled condition of the spring and gib in the socket, the bar of the gib traverses the socket and has its ends and the blades $m$, which project toward the hub of the swift, resting in the slots $e$ of the socket and the gib (which is in effect bifurcated) straddles the outer end portion or collar $f'$ of the spring, which holds the gib with its bar bearing against the outer ends of the slots $e$: the gib (which is otherwise laterally removable through one of the slots) is thus interlocked with and held in the socket by the spring, and in order to remove it the spring must first be compressed until it clears the inner ends of the blades $m$. When the outer part of the skein supporting spoke or member is assembled with the inner part thereof or gib the bar of the gib occupies the enlargement $j$ in shank $g$ and the tongue $n$ projects outwardly into and snugly fits the slit $i$. A slip-grip connection is thus afforded between the outer part and inner part or gib of the spoke. This slip-grip is established by entering the inner end of the shank $g$ into the socket so that it straddles the tongue $n$ and bar $l$ of the gib and until the bar coincides with the enlargement $j$; the gib projects beyond the side of the socket, as shown in Fig. 5 so that it can be grasped by the operator's hand and held against inward movement when the outer part of the spoke is thus forced radially inward to establish the connection, the convergence of the outer edges of the blades $m$ affording the desired grip for this purpose without offering obstructions on which the material to be wound on the swift might catch. To remove the outer part of the spoke from the inner part or gib the former is forced radially outwardly with sufficient force to overcome the slip grip connection, the gib then of course remaining held by the spring bearing against the stop formed by the outer ends of slots $e$.

In view of the foregoing it will be seen that the gib is so constructed as to have an interlock with the spring, so that whether or not the outer part of the spoke is present the gib and spring will remain assembled with the socket unless the spring is forced inward to clear the gib and allow it to move laterally out of the socket; further, the blades $m$ which form the interlock also afford extended bearing surfaces to engage the sides of the slots $e$ and thus reduce the wear which the sides of the slot would otherwise undergo if the bar were without the extended bearing surfaces, especially, if, as preferred, the sockets $e$ are formed of fiber, papier mâché, wood or the like. To the same end, the tongue saves wear and tear on the shank $g$ at $j$ incident to any turning or twisting of the outer part of a spoke when assembled with the inner part on its own axis.

The end convolution of spring $f'$ being close together the bar of the gib cannot work its way between the convolutions, as an incident to possible turning of the spring on its own axis. Ocasionally the slitted inner end of a part $g$ will spread or expand so that it will not effectually hold or grip the gib; the outer end of the spring rather snugly embraces such slitted end according to the preferred form of the invention, so as to prevent this expanding and consequent relation of the grip.

Having thus fully described my invention, what I claim as new and desire to secure by Letters Patent is:—

1. In combination, with the radial socket of the center part of a swift, said socket having longitudinal slots terminating at their outer ends short of the outer end of the socket and thus forming a stop, a skein supporting member radially movable in said socket and including a gib slidable in said slots and a skein receiving part disconnectively attached to the gib and projecting radially from the socket, and a spring confined in the socket and holding the gib bearing against said stop, the gib being removable laterally through one of the slots but being normally interlocked with the spring and thereby held against such removal.

2. In combination, with the radial socket of the center part of a swift, said socket having longitudinal slots terminating at their outer ends short of the outer end of the socket and thus forming a stop, a skein supporting member radially movable in said socket and including a bifurcated gib slidable in said slots and a skein receiving part disconnectively attached to the gib and projecting radially from the socket, and a spring confined in the socket and holding the gib bearing against said stop, the gib being removable laterally through one of the slots but normally straddling the spring and being thereby held against such removal.

3. In combination, with the radial socket of the center part of a swift, said socket having opposite longitudinal guideways, a radially movable gib extending across the socket and having spaced bearing portions each elongated in the direction of the length of the socket and respectively engaged in said guideways, and a skein-receiving part disconnectively attached to the gib.

4. In combination, with the radial socket of the center part of a swift, said socket having opposite longitudinal guideways, a radially movable gib extending across the socket and engaged in said guideways and having a tongue projecting radially outwardly, and a skein supporting member arranged in said socket and having a radial slit formed therein and receiving said tongue and forming a slip-grip connection with the gib.

5. In combination, with the radial socket of the center part of a swift, said socket having opposite longitudinal guideways, a radially movable spoke having lateral portions projecting into said guideways, and a spiral spring arranged in the socket and inwardly abutted by said portions, the outer end convolutions of the spring being arranged close together whereby to prevent said portions entering between said end convolutions.

6. The combination, with the radial socket of the center part of a swift, a radial and radially movable skein-supporting spoke including an inner and an outer part, the outer part being detachable from the inner part and having a radial slit receiving and forming a slip grip connection with the outer part, and a spiral spring resisting inward movement of the spoke and embracing and thereby holding the slitted portion of said outer part against expansion.

In testimony whereof I affix my signature.

WILLIAM C. KEYWORTH.